(12) United States Patent
Rosenblatt et al.

(10) Patent No.: US 10,580,300 B1
(45) Date of Patent: Mar. 3, 2020

(54) PARKING MANAGEMENT SYSTEMS AND METHODS

(71) Applicant: Ford Global Technologies, LLC, Dearborn, MI (US)

(72) Inventors: Danielle Rosenblatt, Dearborn, MI (US); Hamid M. Golgiri, Livonia, MI (US); Anthony Melatti, Dearborn, MI (US); Jack Van hoecke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/109,515

(22) Filed: Aug. 22, 2018

(51) Int. Cl.
*G08G 1/14* (2006.01)
*B64C 39/02* (2006.01)
*G08G 1/0968* (2006.01)

(52) U.S. Cl.
CPC .......... *G08G 1/142* (2013.01); *B64C 39/024* (2013.01); *G08G 1/0968* (2013.01); *B64C 2201/12* (2013.01)

(58) Field of Classification Search
CPC .... G08G 1/142; G08G 1/0968; B64C 39/024; B64C 2201/12
See application file for complete search history.

(56) References Cited

U.S. PATENT DOCUMENTS

| | | | |
|---|---|---|---|
| 6,917,307 B2 * | 7/2005 | Li | G08G 1/14 194/902 |
| 7,135,991 B2 | 11/2006 | Slemmer et al. | |
| 7,688,225 B1 | 3/2010 | Haynes et al. | |
| 9,761,139 B2 | 9/2017 | Acker, Jr. et al. | |
| 2014/0085109 A1 * | 3/2014 | Stefik | G06Q 10/02 340/932.2 |
| 2014/0372185 A1 | 12/2014 | Ganot | |
| 2016/0042643 A1 * | 2/2016 | Hohenacker | G08G 1/04 705/13 |
| 2017/0154530 A1 | 6/2017 | Irion et al. | |
| 2017/0329342 A1 * | 11/2017 | Kazama | G05D 1/0011 |
| 2018/0233038 A1 * | 8/2018 | Kozloski | G08G 1/0175 |

FOREIGN PATENT DOCUMENTS

CN 106781665 A 5/2017

* cited by examiner

*Primary Examiner* — Benyam Haile
*Assistant Examiner* — Mancil Littlejohn, Jr.
(74) *Attorney, Agent, or Firm* — Brandon Hicks; Eversheds Sutherland (US) LLP (57) ABSTRACT

Example parking management systems and methods are described. In one implementation, a method receives an image that includes a parking area for the unmarked parking of vehicles. The method defines a plurality of unmarked parking spaces in the parking area and assigns a first vehicle to a first unmarked parking space in the parking area.

20 Claims, 8 Drawing Sheets

PARKING MANAGEMENT SYSTEMS AND METHODS

TECHNICAL FIELD

The present disclosure relates to systems and methods that assist with parking vehicles in unmarked areas.

BACKGROUND

Many stores and other locations accessible by vehicles have parking areas (e.g., parking lots or parking garages) with marked parking spaces. However, in some situations, vehicles need to park in an unmarked area, such as a grass-covered area, a field, a dirt-covered area, and the like. These types of situations may occur, for example, at sporting events, festivals, state fairs, concerts, and so forth. Unmarked parking areas typically require many human attendants to help direct vehicles and maintain driving lanes for vehicles to safely enter and exit the unmarked parking areas. There is a need for an improved approach for parking vehicles in unmarked areas.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and which illustrate specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art should recognize such feature, structure, or characteristic in connection with other embodiments whether or not explicitly described.

Implementations of the systems, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer-usable medium. Such software, when executed in one or more data processing devices, causes a device to operate as described herein.

Figure 1A:
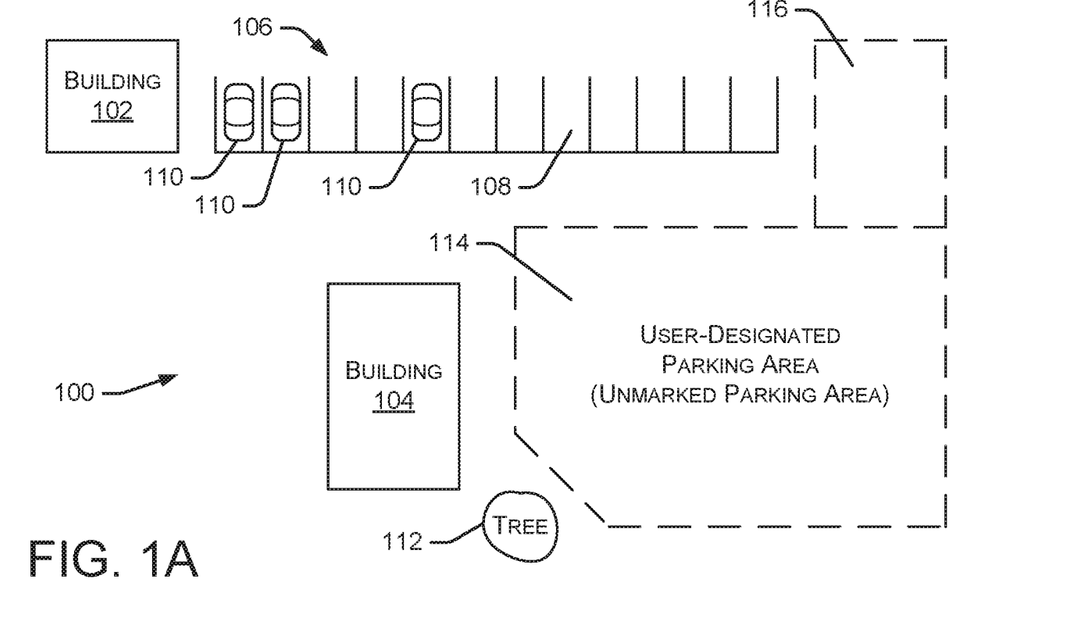
FIGS. 1A and 1B illustrate an aerial view of an example environment within which multiple vehicles can park in an unmarked area.
Figure 1B:
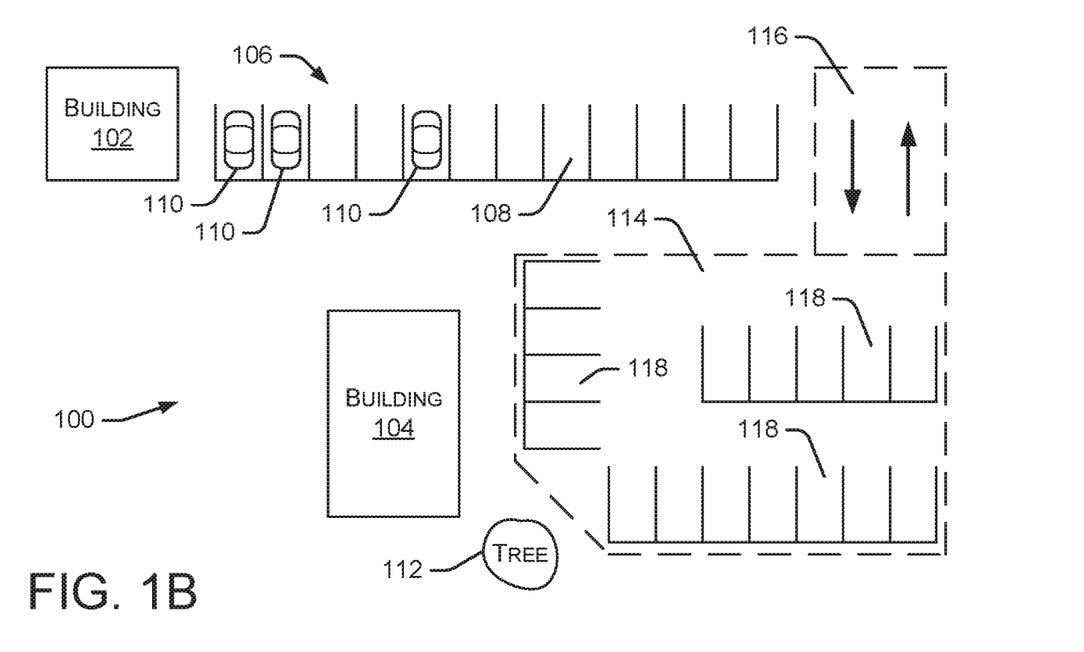

FIGS. 1A and 1B illustrate an aerial view of an example environment 100 within which multiple vehicles can park in an unmarked parking area. In some embodiments, the environment 100 is a geographic area that may include various structures, parking areas, open spaces, and other features. In the example of FIG. 1A, the environment 100 includes two buildings 102 and 104 and a marked parking area 106. The marked parking area 106 may be a paved area with painted lines that define multiple parking spaces 108. The use of the term "marked" when describing the marked parking area 106 refers to the painted lines or other indicators that clearly define the location or boundary of multiple parking spaces 108. As shown in FIG. 1A, three vehicles 110 are shown as being parked in three specific parking spaces 108.

The environment 100 in FIG. 1A also includes a user-designated parking area 114 that is outlined by several dashed lines. The user-designated parking area 114 may also be referred to as an unmarked parking area (e.g., the parking area does not have painted lines or other indicators that clearly define the location or boundary of the parking spaces). In some embodiments, the user-designated parking area 114 includes any area that may be used to park one or more vehicles, such as a grass-covered area, a field, a dirt-covered area, and the like. In particular situations, the user-designated parking area 114 may include a paved surface, such as a parking lot or a driveway, which does not include any marked parking spaces.

As discussed in greater detail below, the user-designated parking area 114 may be manually defined by a user based on a photograph of the environment 100. In other embodiments, the user-designated parking area 114 may be at least partially defined by a computing system, an image editing software tool, and the like. In particular implementations, an image of the environment 100 is captured by a camera above the environment 100, such as a camera mounted to a pole, attached to a drone, or other system capable of generating an aerial view of the environment 100. In some embodiments, the height of the camera above the ground surface of the environment 100 is known such that objects depicted in the captured image can be assigned a particular size scale. A user may define the user-designated parking area 114 by highlighting the parking area and/or identifying a boundary around the parking area. When defining the user-designated parking area 114, the shape of the area may be irregular to account for various objects or other items that represent obstacles to parking vehicles. For example, in FIG. 1A, the boundary of the user-designated parking area 114 is adjusted to avoid a tree 112.

The environment 100 also includes an entrance/exit area 116, which allows vehicles to access the user-designated parking area 114 when entering the parking area and to exit the user-designated parking area 114 when leaving the parking area. In some embodiments, the entrance/exit area 116 is defined by a user and/or a computing system in a manner similar to the definition of the user-designated parking area 114. Although not shown in FIG. 1A, the entrance/exit area 116 may provide a connection between the user-designated parking area 114 and a roadway, a driveway, or another area commonly used for driving vehicles.

After the user-designated parking area 114 is defined, a parking management system (described herein) defines multiple unmarked parking spaces within the user-designated parking area 114. Referring to FIG. 1B, multiple unmarked parking spaces 118 are shown in the user-designated parking area 114. The unmarked parking spaces 118 do not have any associated physical characteristics in the actual environment. For example, there are no painted lines or other indicators that define the location or boundary of the unmarked parking spaces 118 in the actual environment. Instead, the unmarked parking spaces 118 are generated electronically such that they are stored and managed by the parking management system. The unmarked parking spaces 118 may also be referred to as "virtually assigned unmarked parking spaces" or "virtually created unmarked parking spaces." The example layout of the unmarked parking spaces 118 in FIG. 1B represents one possible layout. Alternate embodiments may arrange or position the unmarked parking spaces 118 in any manner within the user-designated parking area 114.

FIG. 1B also illustrates driving lanes for vehicles within the user-designated parking area 114. These driving lanes provide a path for vehicles to access a particular unmarked parking space 118, such as a particular unmarked parking space 118 assigned to a specific vehicle. FIG. 1B further illustrates traffic flow arrows in the entrance/exit area 116 that indicate a desired traffic flow direction for vehicles entering and exiting the user-designated parking area 114.

Figure 2:
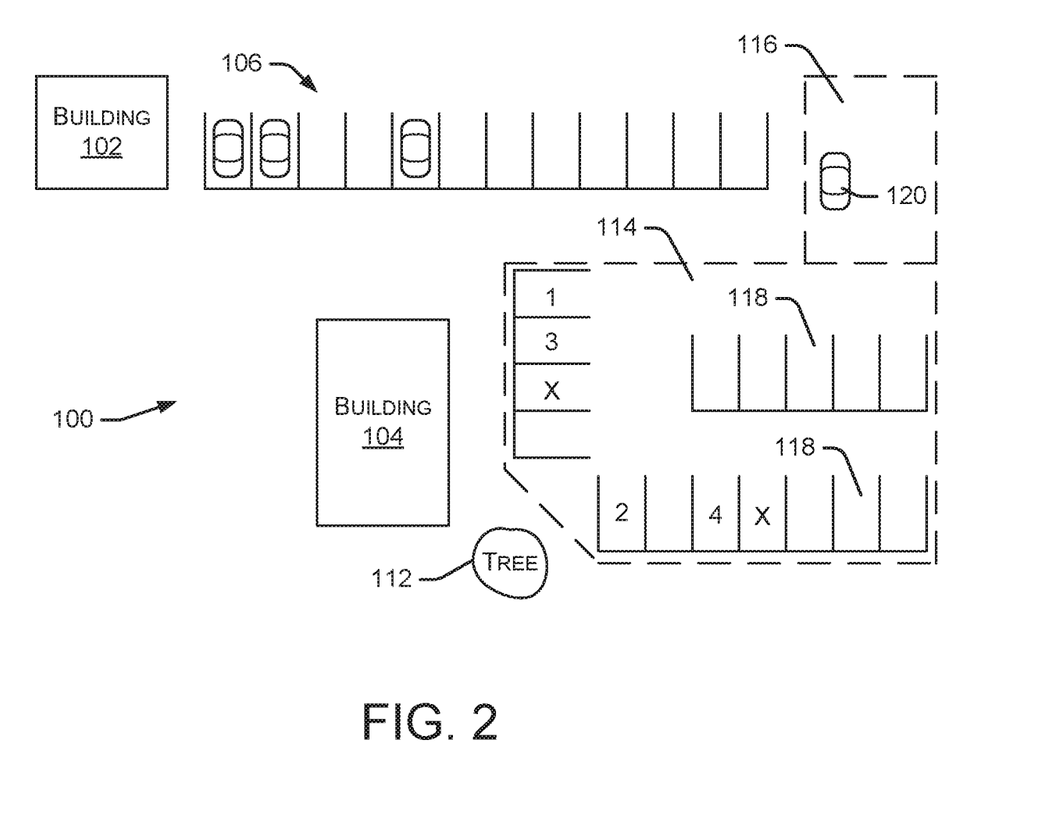
FIG. 2 illustrates an aerial view of an example environment within which multiple vehicles can park in an unmarked area.

FIG. 2 illustrates the environment 100 as described in FIGS. 1A and 1B with multiple vehicles assigned to particular unmarked parking spaces 118. In the example of FIG. 2, four vehicles (numbered 1, 2, 3, and 4) are shown in particular unmarked parking spaces 118. Additionally, two unmarked parking spaces 118 are labeled with an "X,"

indicating that the particular parking space is already occupied by a vehicle (or other object) or the particular parking space is reserved for a particular vehicle (such as a VIP (Very Important Person)). In some embodiments, the unmarked parking spaces 118 labeled with an "X" may represent a parking space that is designated as "do not use" by, for example, an owner of the parking area. In specific embodiments, an "R" is used to indicate a reserved parking space, an "X" is used to identify a "do not use" parking space or area, and a number (e.g., "1") is used to indicate an occupied or assigned parking space. Several remaining unmarked parking spaces 118 (without a number or "X") remain available for parking additional vehicles. For example, a new vehicle 120 desires to park in the user-designated parking area 114 and is entering the entrance/exit area 116.

As discussed in greater detail below, a parking management system detects the vehicle 120, selects an appropriate unmarked parking space 118 for the vehicle 120, calculates a path to the selected parking space, and communicates navigation instructions to the vehicle 120. Since the unmarked parking spaces 118 do not have any physical markings on the ground or other indicators that clearly define the location or boundary of the unmarked parking spaces 118, it is important to provide detailed instructions to the vehicle 120. If the vehicle 120 is an autonomous vehicle, the instructions are used by the vehicle 120 to automatically navigate to the selected parking space. If the vehicle 120 is a human-driven vehicle, the instructions are communicated (e.g., visually and/or audibly) to a driver of the vehicle 120 to assist the driver in navigating to the selected parking space. In some embodiments, the instructions are communicated from an infotainment system (or navigation system) in the vehicle 120 to the driver. In other embodiments, the instructions may be communicated to a mobile device or other system carried by the driver of the vehicle 120, carried by a passenger of the vehicle 120, or otherwise located in or associated with the vehicle 120.

Figure 3:
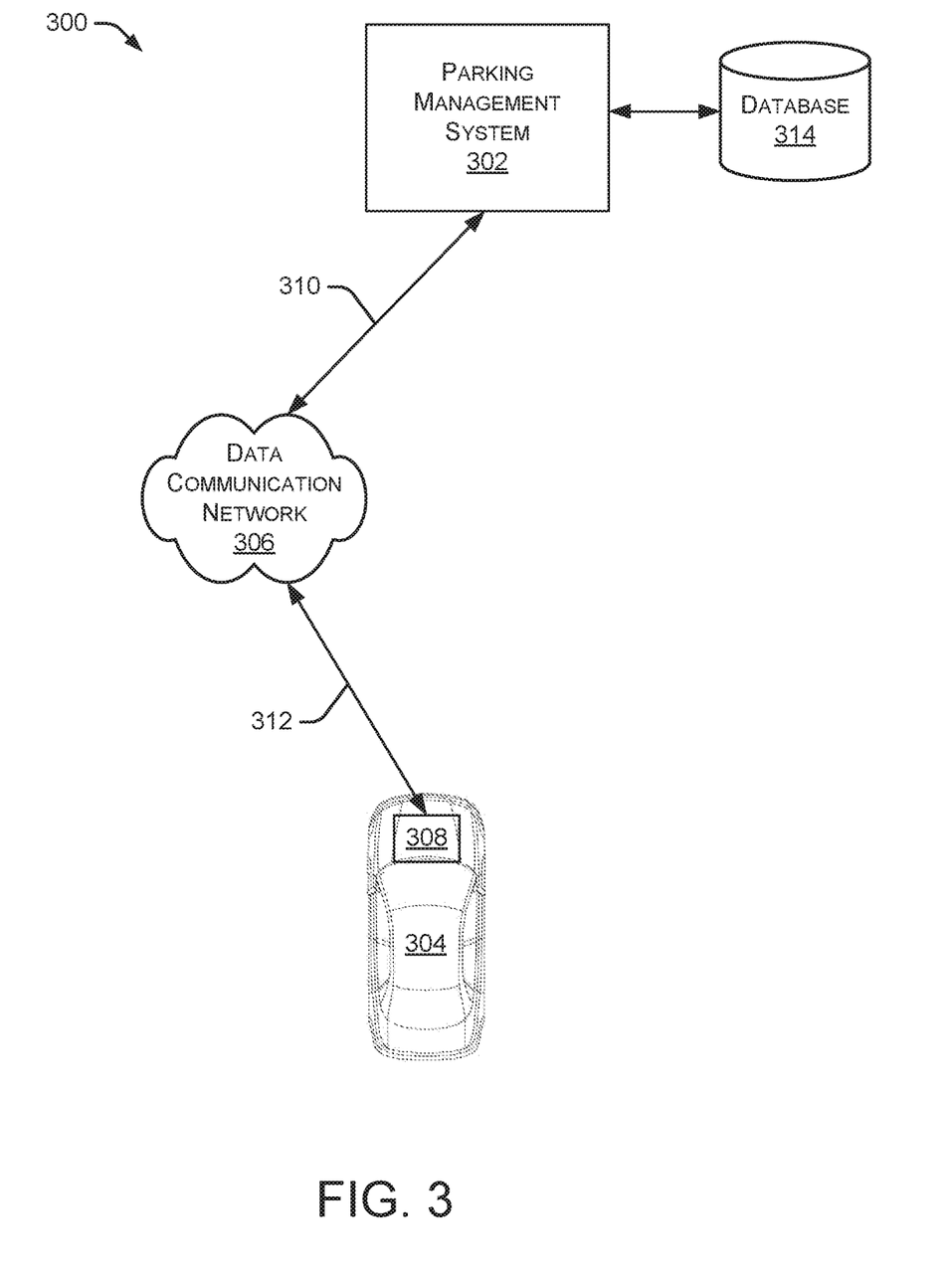
FIG. 3 is a block diagram illustrating an environment within which a vehicle can communicate with a parking management system.

FIG. 3 is a block diagram illustrating an environment 300 within which a vehicle 304 can communicate with a parking management system 302. In some embodiments, the parking management system 302 communicates with the vehicle 304 via a data communication network 306. The data communication network 306 includes any type of network topology using any communication protocol. Additionally, the data communication network 306 may include a combination of two or more communication networks. In some embodiments, the data communication network 306 includes a cellular communication network, the Internet, a local area network, a wide area network, or any other communication network. The parking management system 302 is coupled to a database 314 that stores data used by the parking management system 302 and data created by the parking management system 302. In some embodiments, the database 314 stores information related to the user-designated parking areas, the unmarked parking spaces, the current vehicles parked in a user-designated parking area, and the like.

As discussed herein, the parking management system 302 performs various functions related to defining unmarked parking spaces in a user-designated parking area, assigning unmarked parking spaces to specific vehicles, determining a path for the vehicle to follow to the assigned parking space, and communicating navigation instructions to the vehicle. Additionally, the parking management system 302 manages the unmarked parking spaces based on incoming vehicles, exiting vehicles, the specific locations of parked vehicles, and the like. Further details regarding the operation of parking management system 302 are provided herein.

In some embodiments, the vehicle 304 is an autonomous vehicle. The vehicle 304 includes a vehicle management system 308 that controls various vehicle operations, such as automated driving systems, driving assistance systems, climate control systems, engine control systems, suspension control systems, infotainment systems, collision avoidance systems, navigation systems, and the like. As described herein, the vehicle management system 308 is capable of communicating with the parking management system 302 to receive parking instructions and other information.

As shown in FIG. 3, the parking management system 302 communicates with the data communication network 306 via a communication link 310, and the vehicle management system 308 communicates with the data communication network 306 via a communication link 312. Any communication protocol may be used for communications between the data communication network 306 and the parking management system 302 and the vehicle management system 308. For example, the communications may use 3G, 4G LTE, WiFi, and the like.

It will be appreciated that the embodiment of FIG. 3 is given by way of example only. Other embodiments may include fewer or additional components without departing from the scope of the disclosure. Additionally, illustrated components may be combined or included within other components without limitation.

Figure 4:
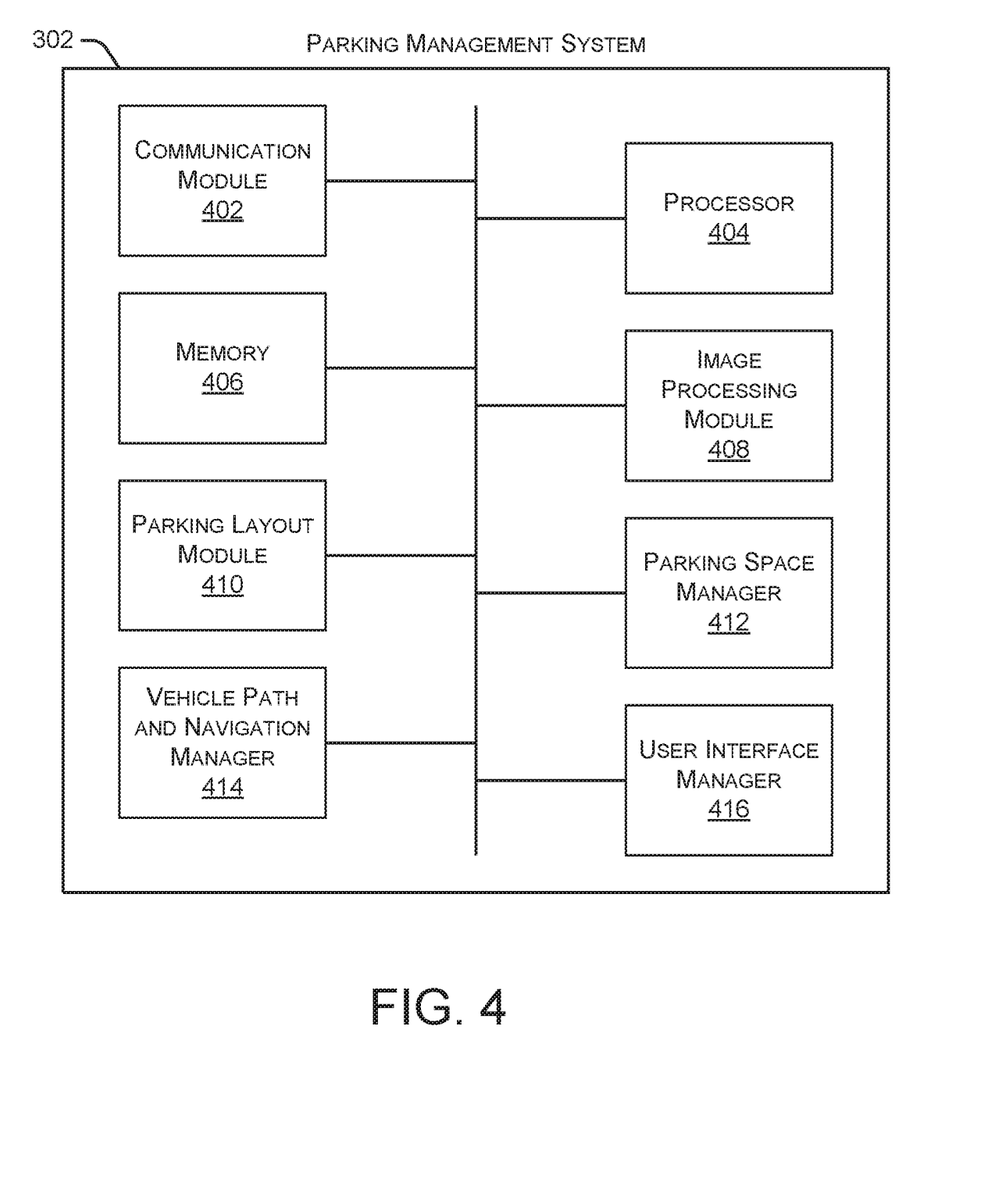
FIG. 4 is a block diagram illustrating an embodiment of a parking management system.

FIG. 4 is a block diagram illustrating an embodiment of the parking management system 302. As shown in FIG. 4, the parking management system 302 includes a communication module 402, a processor 404, and a memory 406. The communication module 402 allows the parking management system 302 to communicate with other systems and devices, such as the database 314, the data communication network 306, the vehicle management system 308, and the like. The processor 404 executes various instructions to implement the functionality provided by the parking management system 302, as discussed herein. The memory 406 stores these instructions as well as other data used by the processor 404 and other modules and components contained in the parking management system 302.

The parking management system 302 also includes an image processing module 408 that may receive, process and/or analyze one or more images, such as aerial images of the environment 100. For example, the image processing module 408 may identify objects or other items in an aerial image and allow a user (or other system) to identify areas of the aerial image that are available for unmarked parking. A parking layout module 410 may, for example, define or create multiple unmarked parking spaces in the area available for unmarked parking.

The parking management system 302 also includes a parking space manager 412 that may monitor vehicles parked in each of the unmarked parking spaces and monitor new vehicles seeking access to the area available for unmarked parking as well as vehicles leaving the area available for unmarked parking. In some embodiments, the parking space manager 412 may maintain a parking status associated with each of the unmarked parking spaces. For example, the parking status may include occupied (e.g., a vehicle is in the particular unmarked parking space), available (e.g., the unmarked parking space is available to receive a vehicle), reserved (e.g., the unmarked parking space is empty, but is reserved for another vehicle or intentionally left empty), and unavailable (e.g., the unmarked parking space cannot be used due to an issue preventing vehicles from safely parking in the space).

A vehicle path and navigation manager 414 may, for example, determine a path for routing a vehicle from the vehicle's current location to an assigned unmarked parking space. In some embodiments, the vehicle path and navigation manager 414 communicates (via the communication module 402) the path and/or specific navigation commands to a vehicle or other device providing the path and/or specific navigation commands to a driver or a passenger of the vehicle. In particular implementations, the vehicle path and navigation manager 414 communicates (via the communication module 402) the path and/or specific navigation commands to an unmanned aerial vehicle (UAV) that guides the vehicle to an assigned unmarked parking space.

The parking management system 302 further includes a user interface manager 416 that may allow a user to interface with any of the components of the parking management system 302. For example, the user interface manager 416 may allow a user to interact with the image processing module 408 to identify areas of an aerial image that are available for unmarked parking of vehicles.

Figure 5:
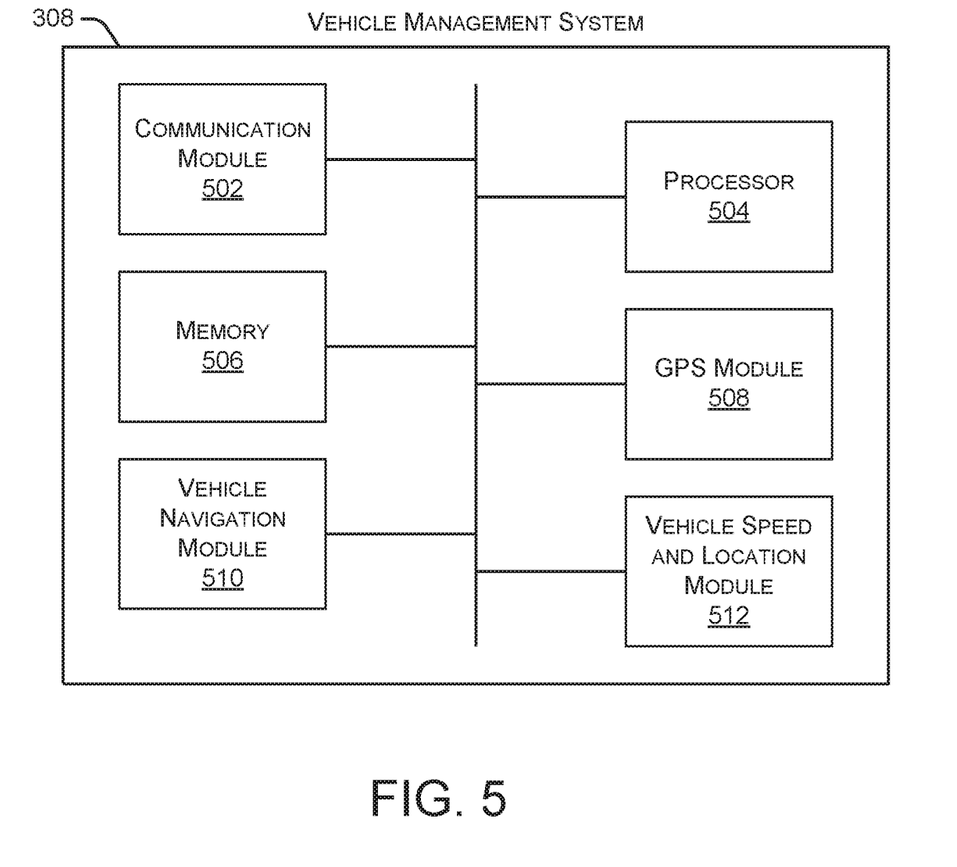
FIG. 5 is a block diagram illustrating an embodiment of a vehicle management system.

FIG. 5 is a block diagram illustrating an embodiment of the vehicle management system 308. As shown in FIG. 5, the vehicle management system 308 includes a communication module 502, a processor 504, and a memory 506. The communication module 502 allows the vehicle management system 308 to communicate with other systems and devices, such as the parking management system 302, the database 314, the data communication network 306, and the like. The processor 504 executes various instructions to implement the functionality provided by the vehicle management system 308, as discussed herein. The memory 506 stores these instructions as well as other data used by the processor 504 and other modules and components contained in the vehicle management system 308.

The vehicle management system 308 also includes a GPS (Global Positioning System) module 508 that may receive GPS data from one or more GPS sensors or GPS systems associated with the vehicle 304. In some embodiments, the GPS module 508 can determine a current location of the vehicle 304. A vehicle navigation module 510 can assist with navigating the vehicle 304 to an assigned parking space or other location. A vehicle speed and location module 512 can monitor a location, a speed, and a direction of travel for the vehicle 304.

Figure 6:
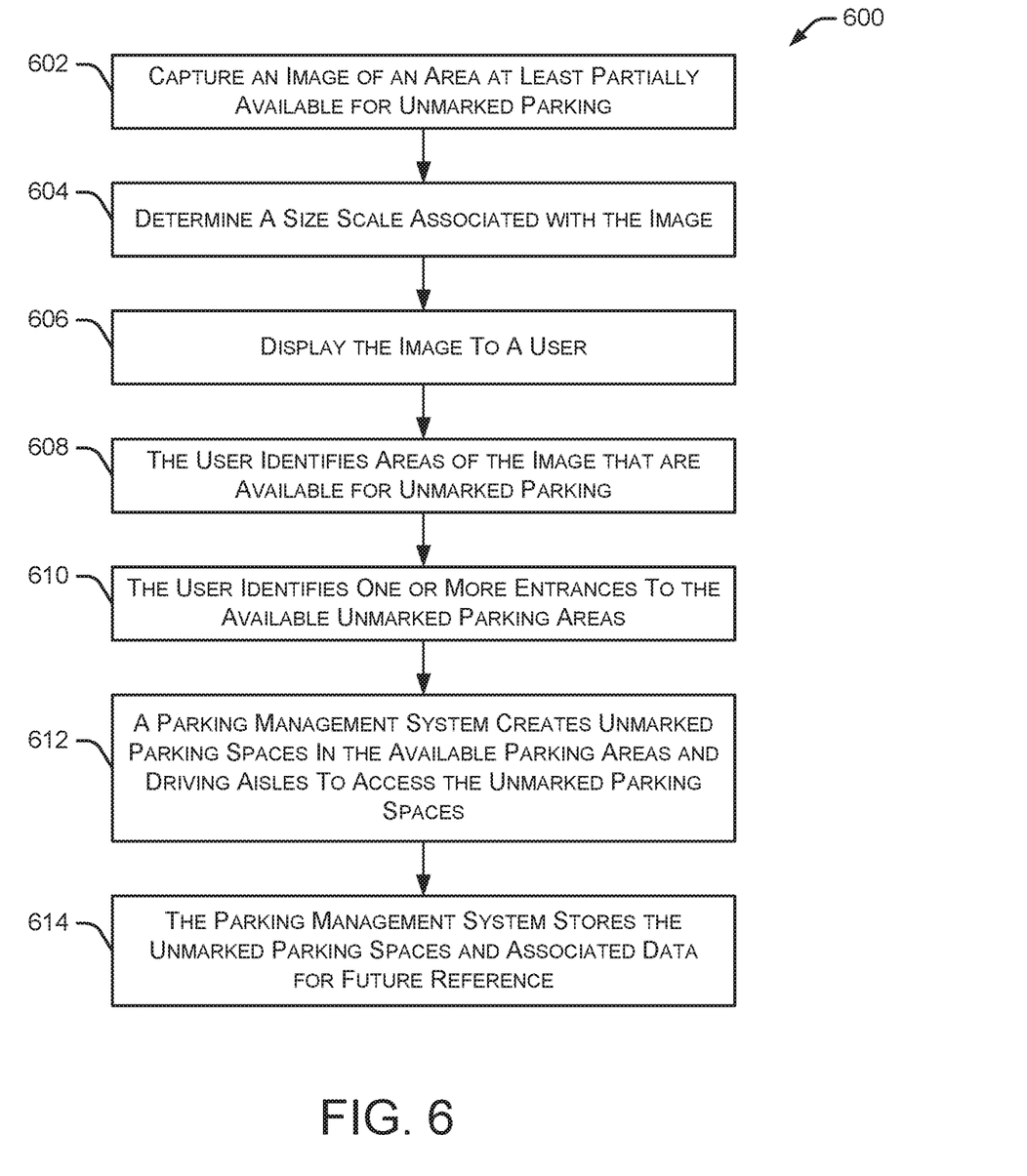
FIG. 6 illustrates an embodiment of a method for creating parking spaces in an unmarked area.

FIG. 6 illustrates an embodiment of a method 600 for creating parking spaces in an unmarked area. Initially, at block 602, the method 600 captures an image (or receives a captured image) of an area at least partially available for unmarked parking. At block 604, the method determines a size scale associated with the image. For example, the size scale may be based on a vertical distance from the ground surface in the image to a camera that captured the image. In some embodiments, the size scale is based on the field of view (FOV) of the camera which may be determined based on the focal length of the camera's lens. The FOV of the camera combined with the known distance from the camera to the ground surface is used to determine the size scale.

The method 600 continues at block 606 by displaying the image to a user. For example, the image may be displayed via a display device coupled to the parking management system 302 or any other image editing/image processing system. At block 608, the user then identifies areas of the image that are available for unmarked parking, which identification may be received by the management system 302; for example, in FIG. 1A, a user-designated parking area 114 in the environment 100. In some embodiments, a user interacts with a user interface (e.g., a graphical user interface) to identify a location and/or boundaries of one or more areas in the image that are available for unmarked parking. In some embodiments, the user interface may include an HMI (human-machine interface) display, an in-vehicle HUD (heads-up display), an external screen display, a connected mobile device, an application executing on a mobile device, and the like. At block 610, the user also identifies one or more entrances (and/or exits) to the available unmarked parking areas, which identification may be received by the management system 302. As discussed herein, the entrance/exit area (e.g., the entrance/exit area 116 in FIGS. 1A and 1B) allows vehicles to access the area available for unmarked parking. In some embodiments, the entrance/exit area may provide a connection between the areas available for unmarked parking and a roadway, a driveway, or another area commonly used for driving vehicles.

At block 612, a parking management system creates one or more unmarked parking spaces in the areas available for unmarked parking as well as driving aisles to access the unmarked parking spaces. In some embodiments, a 2D spatial layout algorithm is used to create the unmarked parking spaces. For example, the input to the algorithm includes the perimeter of the parking area and an estimated parking space needed for a typical vehicle. The algorithm then provides a layout that maximizes the number of individual parking spaces (including access paths) that can fit within the defined perimeter of the parking area. The automatic creation of the unmarked parking spaces can be confirmed and/or modified by a human operator. The example of FIG. 1B shows an example arrangement of multiple unmarked parking spaces 118. In some embodiments, the size, location, and orientation of the unmarked parking spaces is based on a number of vehicles expected to park in the unmarked parking area, the average size of the vehicles expected to park in the unmarked parking area, and other factors. In some embodiments, the other factors may include the planned entry and exit locations for the parking area, fixed features or obstacles in the parking area, and the proximity of designated walking paths near the parking area and within the parking area. After creating the multiple unmarked parking spaces, at block 614, the parking management system stores information defining the unmarked parking spaces and associated data for future reference. For example, the data associated with the unmarked parking spaces may be used for future events where similar unmarked parking spaces are needed.

Figure 7:
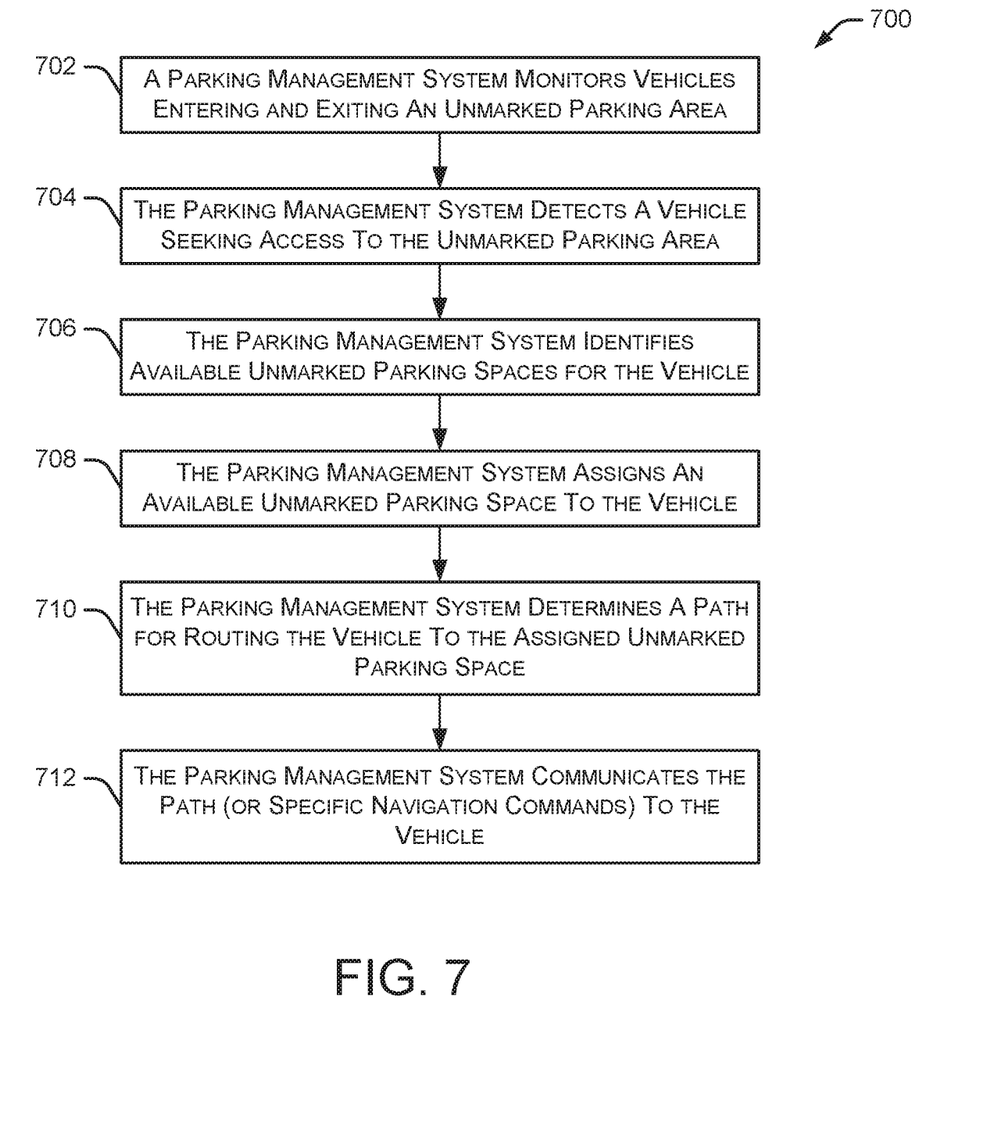
FIG. 7 illustrates an embodiment of a method for monitoring available parking spaces and assigning parking spaces to vehicles.

FIG. 7 illustrates an embodiment of a method 700 for monitoring available parking spaces and assigning parking spaces to vehicles. Initially, at block 702, a parking management system monitors vehicles entering and exiting an unmarked parking area. In some embodiments, the parking management system may adjust one or more unmarked parking spaces based on how actual vehicles parked in the unmarked parking area. For example, if a particular vehicle improperly parked such that it occupies two unmarked parking spaces, the parking management system may adjust the boundaries of nearby unmarked parking spaces based on the improperly parked vehicle. Additionally, if a specific vehicle is significantly larger than the expected vehicle size, that vehicle may need to have a "modified" unmarked parking space that is large enough to accommodate the larger vehicle. In this situation, the parking management system may create a new (larger) unmarked parking space for that larger vehicle, which may also require adjusting the size, location and/or orientation of other unmarked parking spaces near the new (larger) unmarked parking space.

The method 700 continues at block 704 where the parking management system detects a vehicle seeking access to the unmarked parking area. For example, the parking management system may detect the vehicle 120 in the entrance/exit area 116 (as shown in FIG. 2) that is entering the unmarked parking area. In some embodiments, the parking management system detects vehicles seeking access to the unmarked parking area using a camera that captures images of the entrance/exit area 116. In some embodiments, weight sensors, RFID (radio-frequency identification) scanners, GPS locators, pressure hoses, and/or buried inductive loop counters are used to detect vehicles entering or exiting the unmarked parking area. After detecting a vehicle seeking access to the unmarked parking area, at block 706, the parking management system identifies available unmarked parking spaces for the vehicle. At block 708, the parking management system then assigns an available unmarked parking space to the vehicle. In some embodiments, the parking management system assigns the unmarked parking space based on a size of the vehicle. In particular implementations, the parking management system assigns vehicles to the unmarked parking spaces on a first come, first served basis. Other implementations may attempt to fill the closest parking spaces first or fill the farthest parking spaces first. Other factors that may be determined when assigning parking spaces include time of day, number of vehicles already parked, location of walking paths, proximity to "primary locations" such as main buildings or attractions, weather, vehicle occupant's special needs (e.g., handicapped occupants), vehicle occupant parking spot requests, and vehicle weight.

The method continues at block 710 in which the parking management system determines a path for routing the vehicle to the assigned unmarked parking space. At block 712, the parking management system then communicates the path (or specific navigation commands) to the vehicle and/or a vehicle occupant. For example, if the vehicle is an autonomous vehicle, the path or navigation commands are used by the vehicle to automatically navigate to the assigned unmarked parking space. If the vehicle is a human-driven vehicle, the path or navigation commands are communicated (e.g., visually and/or audibly) to a driver of the vehicle to assist the driver in navigating to the assigned unmarked parking space. In some situations, the path or navigation commands are displayed (or otherwise presented) to the driver from an infotainment system (or navigation system) in the vehicle. In other embodiments, the path or navigation commands may be communicated to a mobile device or other system carried by the driver of the vehicle, carried by a passenger of the vehicle, or otherwise located in or associated with the vehicle.

In particular implementations, the path or navigation commands are communicated to a UAV that guides the vehicle to the assigned unmarked parking space. For example, the UAV may fly ahead of the vehicle to "lead" the vehicle to the assigned unmarked parking space. In some embodiments, the UAV may include any combination of visual and/or audio notifications to communicate with the driver of a vehicle. The UAV may also communicate with the vehicle via in-vehicle HMI, connected mobile devices, and the like. Use of a UAV to guide the vehicle to an assigned unmarked parking space eliminates (or reduces) the need for human attendants to direct vehicles to specific parking spaces.

Figure 8:
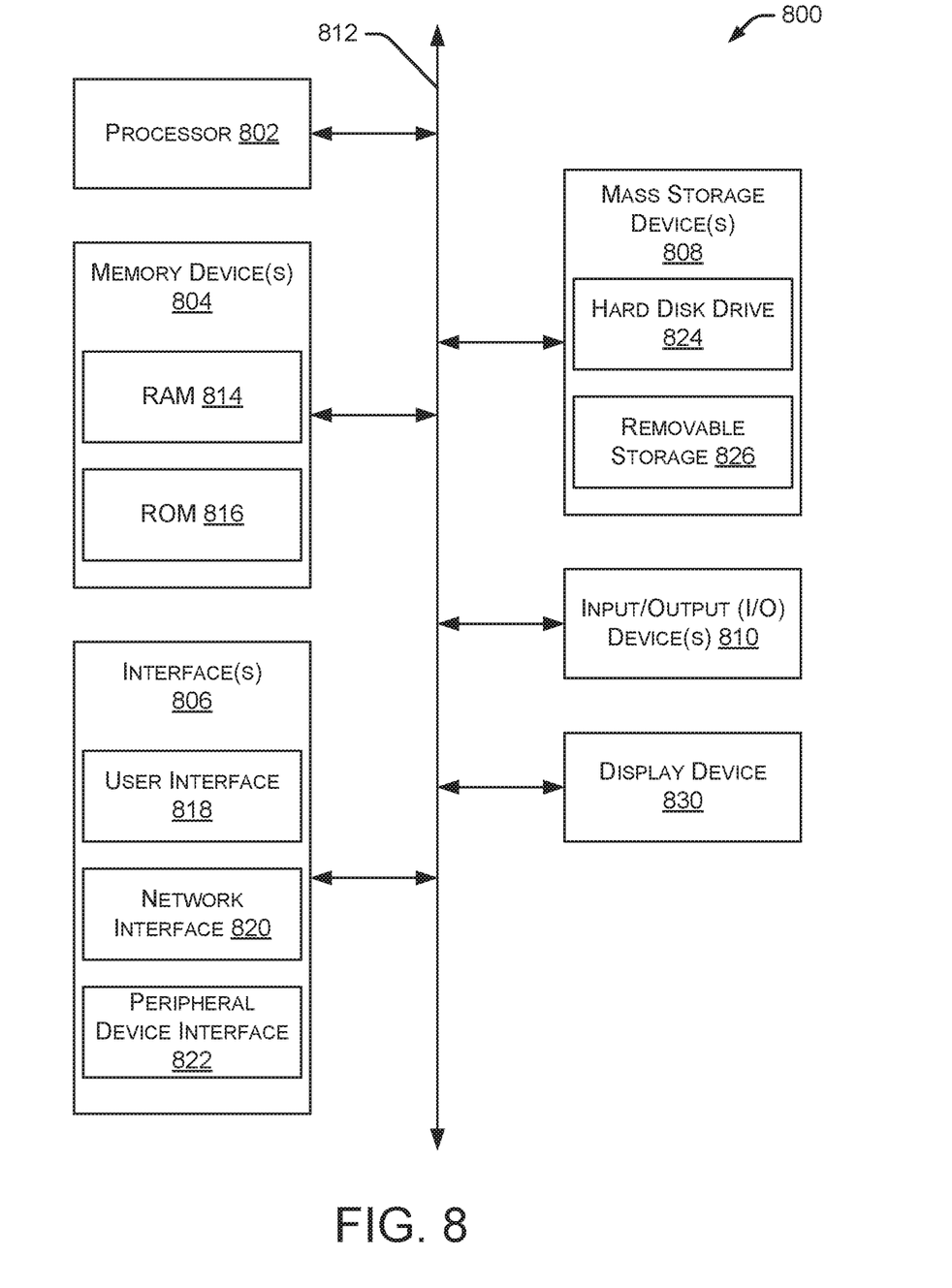
FIG. 8 illustrates an example block diagram of a computing device.

FIG. 8 illustrates an example block diagram of a computing device 800. The computing device 800 may be used to perform various procedures, such as those discussed herein. The computing device 800 may perform any of the functions or methods of the parking management system 302, the vehicle management system 308, and/or any other computing entity. The computing device 800 can perform various functions as discussed herein, and can execute one or more application programs, such as the application programs or functionality described herein. The computing device 800 can be any of a wide variety of computing devices, such as a desktop computer, an in-dash computer, a vehicle control system, a notebook computer, a server computer, a handheld computer, a tablet computer, a wearable device, and the like.

The computing device 800 includes one or more processor(s) 802, one or more memory device(s) 804, one or more interface(s) 806, one or more mass storage device(s) 808, one or more input/output (I/O) device(s) 810, and a display device 830 all of which are coupled to a bus 812. The processor(s) 802 include one or more processors or controllers that execute instructions stored in the memory device(s) 804 and/or the mass storage device(s) 808. The processor(s) 802 may also include various types of computer-readable media, such as cache memory.

The memory device(s) 804 include various computer-readable media, such as volatile memory (e.g., random access memory (RAM) 814) and/or non-volatile memory (e.g., read-only memory (ROM) 816). The memory device(s) 804 may also include rewritable ROM, such as flash memory.

The mass storage device(s) 808 include various computer-readable media, such as magnetic tapes, magnetic disks, optical disks, solid-state memory (e.g., flash memory), and so forth. As shown in FIG. 8, a particular mass storage device is a hard disk drive 824. Various drives may also be included in the mass storage device(s) 808 to enable reading from and/or writing to the various computer-readable media. The mass storage device(s) 808 include removable storage 826 and/or non-removable media.

The I/O device(s) 810 include various devices that allow data and/or other information to be input to or retrieved from the computing device 800. Example I/O device(s) 810 include cursor control devices, keyboards, keypads, microphones, monitors or other display devices, speakers, printers, network interface cards, modems, and the like.

The display device 830 includes any type of device capable of displaying information to one or more users of the computing device 800. Examples of the display device 830 include a monitor, display terminal, a video projection device, and the like.

The interface(s) 806 include various interfaces that allow the computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include a user interface 818 and a peripheral device interface 822. The interface(s) 806 may also include one or more user interface 818 elements. The interface(s) 806 may also include one or more peripheral interfaces such as interfaces for printers, pointing devices (mice, track pad, or any suitable user interface now known to those of ordinary skill in the field, or later discovered), keyboards, and the like.

The bus 812 allows the processor(s) 802, the memory device(s) 804, the interface(s) 806, the mass storage device(s) 808, and the I/O device(s) 810 to communicate with one another, as well as other devices or components coupled to the bus 812. The bus 812 represents one or more of several types of bus structures, such as a system bus, a PCI bus, an IEEE bus, a USB bus, and so forth.

For purposes of illustration, programs and other executable program components are shown herein as discrete blocks, although it is understood that such programs and components may reside at various times in different storage components of the computing device 800, and are executed by the processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

In some instances, the following examples may be implemented together or separately by the systems and methods described herein.

Example 1 may include a method comprising: receiving, by a parking management system comprising at least one processor in communication with at least one memory, an image, wherein the image includes a parking area for unmarked parking of vehicles; determining, by the parking management system, a plurality of unmarked parking spaces in the parking area; and assigning, by the parking management system, a first vehicle to a first unmarked parking space in the parking area.

Example 2 may include the method of example 1 and/or some other example herein, further comprising defining, by the parking management system, an entrance area for vehicles to access the parking area.

Example 3 may include the method of example 1 and/or some other example herein, further comprising receiving, by the parking management system, information associated with vehicles to be parked in the parking area.

Example 4 may include the method of example 3 and/or some other example herein, wherein defining the plurality of unmarked parking spaces is based on the information associated with the vehicles to be parked in the parking area.

Example 5 may include the method of example 1 and/or some other example herein, further comprising determining, by the parking management system, a parking status of one or more unmarked parking spaces.

Example 6 may include the method of example 5 and/or some other example herein, wherein the parking status of each unmarked parking space includes at least one of occupied, available, reserved, or unavailable.

Example 7 may include the method of example 5 and/or some other example herein, further comprising determining, by the parking management system, the parking status of the unmarked parking spaces based on a second vehicle parking in the parking area.

Example 8 may include the method of example 5 and/or some other example herein, further comprising determining, by the parking management system, the parking status of the unmarked parking spaces based on the first vehicle leaving the parking area.

Example 9 may include the method of example 1 and/or some other example herein, further comprising determining, by the parking management system, at least a portion of the plurality of unmarked parking spaces based on an actual parking location of a vehicle in the parking area.

Example 10 may include the method of example 1 and/or some other example herein, further comprising determining, by the parking management system, a path for routing the first vehicle to the first unmarked parking space.

Example 11 may include the method of example 10 and/or some other example herein, further comprising communicating, by the parking management system, navigation commands to the first vehicle, wherein the navigation commands are based on the path for routing the first vehicle to the first unmarked parking space.

Example 12 may include the method of example 10 and/or some other example herein, further comprising guiding, by the parking management system, the first vehicle to the first unmarked parking space using an unmanned aerial vehicle (UAV) that follows the path for routing the first vehicle to the first unmarked parking space.

Example 13 may include the method of example 1 and/or some other example herein, further comprising determining, by the parking management system, at least one driving aisle positioned to allow vehicles to drive to at least one of the unmarked parking spaces.

Example 14 may include a method comprising: receiving, by a parking management system comprising at least one processor in communication with at least one memory, an image, wherein the image includes a parking area for unmarked parking of vehicles; determining, by the parking management system, a plurality of unmarked parking spaces in the parking area; assigning, by the parking management system, a first vehicle to a first unmarked parking space in the parking area; determining, by the parking management system, a path for routing the first vehicle to the first unmarked parking space; and communicating, by the parking management system, commands associated with the path to the first vehicle.

Example 15 may include the method of example 14 and/or some other example herein, further comprising defining, by the parking management system, an entrance area for vehicles to access the parking area.

Example 16 may include the method of example 14 and/or some other example herein, wherein defining the plurality of unmarked parking spaces is based on information associated with vehicles to be parked in the parking area.

Example 17 may include the method of example 14 and/or some other example herein, further comprising guiding, by the parking management system, the first vehicle to the first unmarked parking space using an unmanned aerial vehicle (UAV) that follows the path for routing the first vehicle to the first unmarked parking space.

Example 18 may include a parking management system comprising: a memory storing computer-executable instructions; and one or more processors coupled to the memory and configured to execute the computer-executable instructions to: receive an image that includes a parking area for unmarked parking of vehicles; determine a plurality of unmarked parking spaces in the parking area; and assign a first vehicle to a first unmarked parking space in the parking area.

Example 19 may include the parking management system of example 18 and/or some other example herein, further comprising a parking space manager configured to maintain a parking status of one or more unmarked parking spaces.

Example 20 may include the parking management system of example 18 and/or some other example herein, further comprising a vehicle path and navigation manager configured to determine a path for routing the first vehicle to the first unmarked parking space.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving, by a parking management system comprising at least one processor in communication with at least one memory, an image of an environment;
   receiving, by the parking management system, a user-designated area of the image of the environment, wherein the user-designated area comprises an unmarked parking area;
   determining, by the parking management system, a plurality of unmarked parking spaces in the unmarked parking area; and
   assigning, by the parking management system, a first vehicle to a first unmarked parking space in the unmarked parking area.

2. The method of claim 1, further comprising defining, by the parking management system, an entrance area for vehicles to access the unmarked parking area.

3. The method of claim 1, further comprising receiving, by the parking management system, information associated with vehicles to be parked in the parking area.

4. The method of claim 3, wherein defining the plurality of unmarked parking spaces is based on the information associated with the vehicles to be parked in the parking area.

5. The method of claim 1, further comprising determining, by the parking management system, a parking status of one or more unmarked parking spaces.

6. The method of claim 5, wherein the parking status of each unmarked parking space includes at least one of occupied, available, reserved, or unavailable.

7. The method of claim 5, further comprising determining, by the parking management system, the parking status of the unmarked parking spaces based on a second vehicle parking in the parking area.

8. The method of claim 5, further comprising determining, by the parking management system, the parking status of the unmarked parking spaces based on the first vehicle leaving the parking area.

9. The method of claim 1, further comprising determining, by the parking management system, at least a portion of the plurality of unmarked parking spaces based on an actual parking location of a vehicle in the parking area.

10. The method of claim 1, further comprising determining, by the parking management system, a path for routing the first vehicle to the first unmarked parking space.

11. The method of claim 10, further comprising communicating, by the parking management system, navigation commands to the first vehicle, wherein the navigation commands are based on the path for routing the first vehicle to the first unmarked parking space.

12. The method of claim 10, further comprising guiding, by the parking management system, the first vehicle to the first unmarked parking space using an unmanned aerial vehicle (UAV) that follows the path for routing the first vehicle to the first unmarked parking space.

13. The method of claim 1, further comprising defining, by the parking management system, at least one driving aisle in the unmarked parking area positioned to allow vehicles to drive to at least one of the unmarked parking spaces.

14. A method comprising:
   receiving, by a parking management system comprising at least one processor in communication with at least one memory, an image of an environment;
   receiving, by the parking management system, a user-designated area of the image of the environment, wherein the user-designated area comprises an unmarked parking area;
   determining, by the parking management system, a plurality of unmarked parking spaces in the unmarked parking area;
   assigning, by the parking management system, a first vehicle to a first unmarked parking space in the unmarked parking area;
   determining, by the parking management system, a path for routing the first vehicle to the first unmarked parking space; and
   communicating, by the parking management system, commands associated with the path to the first vehicle.

15. The method of claim 14, further comprising defining, by the parking management system, an entrance area for vehicles to access the unmarked parking area.

16. The method of claim 14, wherein defining the plurality of unmarked parking spaces is based on information associated with vehicles to be parked in the parking area.

17. The method of claim 14, further comprising guiding, by the parking management system, the first vehicle to the first unmarked parking space using an unmanned aerial vehicle (UAV) that follows the path for routing the first vehicle to the first unmarked parking space.

18. A parking management system comprising:
   a memory storing computer-executable instructions; and
   one or more processors coupled to the memory and configured to execute the computer-executable instructions to:
     receive an image of an environment;
     receive a user-designated area of the image of the environment, wherein the user-designated area comprises an unmarked parking area;
     determine a plurality of unmarked parking spaces in the unmarked parking area; and
     assign a first vehicle to a first unmarked parking space in the unmarked parking area.

19. The parking management system of claim 18, further comprising a parking space manager configured to maintain a parking status of one or more unmarked parking spaces.

20. The parking management system of claim 18, further comprising a vehicle path and navigation manager configured to determine a path for routing the first vehicle to the first unmarked parking space.

* * * * *